US010049210B2

(12) United States Patent
Momot

(10) Patent No.: US 10,049,210 B2
(45) Date of Patent: Aug. 14, 2018

(54) SYSTEM AND METHOD FOR DETECTION OF OMNIENTRANT CODE SEGMENTS TO IDENTIFY POTENTIAL MALICIOUS CODE

(71) Applicant: LEVIATHAN SECURITY GROUP, INC., Seattle, WA (US)

(72) Inventor: Falcon Momot, Seattle, WA (US)

(73) Assignee: LEVIATHAN SECURITY GROUP, INC., Seattle, WA (US)

( * ) Notice: Subject to any disclaimer, the term of this patent is extended or adjusted under 35 U.S.C. 154(b) by 161 days.

(21) Appl. No.: 15/147,801

(22) Filed: May 5, 2016

(65) Prior Publication Data

US 2016/0328560 A1 Nov. 10, 2016

Related U.S. Application Data

(60) Provisional application No. 62/157,354, filed on May 5, 2015.

(51) Int. Cl.

| | |
|---|---|
| ***G06F 21/56*** | (2013.01) |
| ***G06F 9/30*** | (2018.01) |

(52) U.S. Cl.

CPC ........ *G06F 21/563* (2013.01); *G06F 9/30058* (2013.01); *G06F 9/30076* (2013.01); *G06F 2221/033* (2013.01)

(58) Field of Classification Search

None

See application file for complete search history.

(56) References Cited

U.S. PATENT DOCUMENTS

| | | | | |
|---|---|---|---|---|
| 7,802,303 | B1 * | 9/2010 | Zhao | G06F 21/564 370/230 |
| 7,805,758 | B2 * | 9/2010 | Hasegawa | G06F 21/52 705/53 |
| 2008/0189784 | A1 * | 8/2008 | Mangione-Smith | G06F 21/566 726/23 |
| 2011/0099635 | A1 * | 4/2011 | Silberman | G06F 21/56 726/24 |
| 2015/0248556 | A1 * | 9/2015 | Sickendick | G06F 21/563 726/23 |

* cited by examiner

*Primary Examiner* — Benjamin E Lanier

(74) *Attorney, Agent, or Firm* — Vernon Francissen

(57) ABSTRACT

Methods, systems and media are shown for detecting omnientrant code segments to identify potential malicious code involving, for each offset of a code segment, disassembling the code segment from the offset, determining whether the disassembled code is executable, and incrementing an offset execution value. This approach also involves checking whether the offset execution value exceeds an alert threshold value and generating a malicious code alert for the code segment if the offset execution value exceeds the alert threshold value. Some examples further involve, for each executable offset, identifying a final execution address of the offset, comparing the final execution addresses of the offsets for the code segment, and generating the malicious code alert for the code segment if a proportion of the executable offsets have a common value for the final execution address exceeds a frequency threshold.

12 Claims, 5 Drawing Sheets

124

110

112

122

130

Other Networks

120

Network(s) 106

SYSTEM AND METHOD FOR DETECTION OF OMNIENTRANT CODE SEGMENTS TO IDENTIFY POTENTIAL MALICIOUS CODE

CROSS-REFERENCE TO RELATED APPLICATIONS

The present application is related to commonly owned, U.S. Provisional Patent Application Nos. 62/028,173 and 62/014,954, which are incorporated by reference herein in their entirety for all purposes. This application also claims the benefit of U.S. Provisional Patent Appl. No. 62/157,354 for "System and Method for Detection of Omnientrant Code Segments to Identify Potential Malicious Code," filed May 5, 2015, herein incorporated by reference in its entirety for all purposes.

BACKGROUND

Computer networks and the devices and services that reside on them are often the subject of attacks by parties that are attempting to improperly access information and resources or to introduce malicious code to the networks. One type of attack is based on a NOP slide or sled, wherein a sequence of no-operation (NOP) or NOP-like instructions causes the CPU's execution to flow from a point of entry into the sequence towards a branch instruction that contains an address for the attack function code. A NOP sled typically contains a long series, e.g. "landing pad", of NOP or NOP-like instructions to increase the likelihood of execution branching into the NOP sled and initiate execution that leads to the branch instruction, which branches to a malicious code payload.

One property of NOP sleds, that of being executable from any or most starting offsets and having the same effect regardless of which starting offset is used, we consider to have the property we term omnientrancy, or to be omnientrant.

SUMMARY

According to certain aspects of the present invention, methods and systems are provided for detecting omnientrant code segments to identify potential malicious code that involve, for each offset of a code segment, disassembling the code segment from the offset, determining how many valid and executable instructions exist after that offset, and creating a list of offsets at which a valid instruction is found from each of the starting offsets. The determination of instruction offsets may be made either by static analysis or dynamic analysis (e.g. by disassembly or by emulation). The method also involves finding offsets which appear valid given a number of different starting offsets and evaluating whether they occur anomalously often.

One refinement further involves, for each offset which occurs anomalously often, determining which offset is most likely the beginning of malicious code either by statically analyzing for the lowest address with effects on system state, or by dynamically analyzing for malicious behavior. The refinement further involves generating an alert when such malicious behavior is found, and elevating the heuristic probability of exploit code being present where omnientrancy is also found.

Another refinement involves disassembling the code segment within a window of the offset. Still another refinement involves disassembling each code segment in user-controlled memory.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
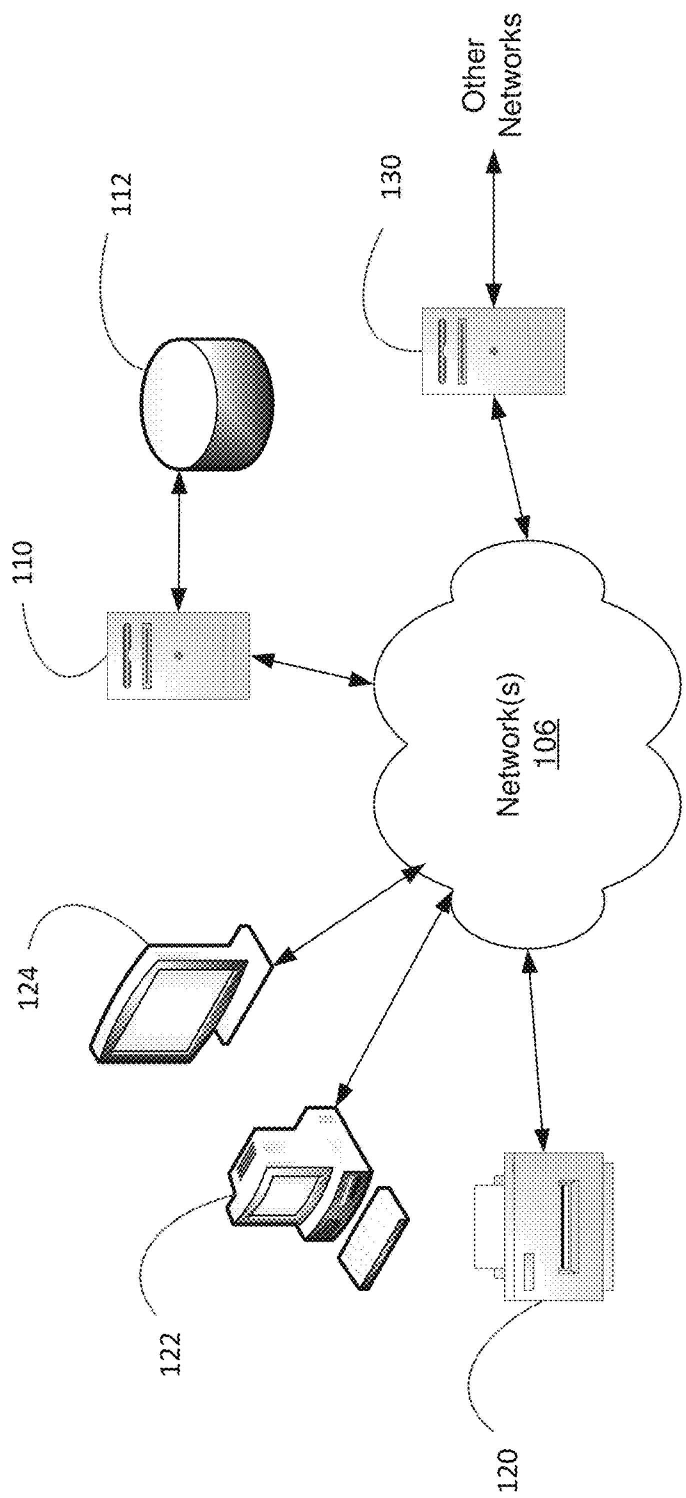
FIG. 1 is a schematic diagram depicting an example of a computer network based system that may be subject to attack and may be suitable for utilization of certain aspects of the present invention.

FIG. 1 is an architecture diagram that depicts aspects of an example of a computer network system with communication among multiple devices. In this example, network 106, which can be one network or multiple networks, provides communication between server 110 connected to database 112 and several client devices, such as printer 120, personal computer 122, and interactive terminal 124. The architecture of FIG. 1 is a simplified representation of an enterprise environment having a multitude of different computing devices that may represent a target for an attack. A gateway 130 provides a communications link between the network 106 and other networks, such as the internet, through which an attacker may launch an attack.

Many instruction set architectures, including x86, have variable-length instructions. The function of an instruction in a variable-length instruction set depends to varying degrees on an entire instruction. The function of an instruction can be significantly changed by removing one or more bytes from the beginning of the instruction. This is particularly true in cases where an instruction contains a mandatory prefix byte that is an escape byte or in cases where a prefix is used to modify the length of a parameter to the instruction, among others. It is also likely that changing the initial offset will change the function of subsequent instructions because each subsequent instruction begins immediately following the last byte of the preceding one.

Exploitation of vulnerabilities in computer programs most commonly involves some degree of uncertainty with respect to the address to which execution will branch, and with respect to the address at which the injection of malicious code will place that malicious code. To overcome this uncertainty at a local scope, it is common for attackers to use NOP sleds, or long series of instructions which do not perform useful work (they need not be literal NOP instructions but commonly are) before the payload, in order to provide an expansive "landing area" to which execution may branch. After execution branches into a NOP sled, the processor will execute successive instructions doing nothing until it reaches the injected malicious code. Then, it will execute the malicious code.

In order to be useful to an attacker, a NOP sled typically has two functional characteristics: they do not affect state that the exploit will utilize; and they lead to execution of the payload when starting from each of multiple addresses within the sled or a significant majority of addresses in the NOP sled. The first property of not affecting state is difficult to detect in nontrivial cases using either static or dynamic analysis since it involves constraint analysis and the programmer's intentions are unknowable.

However, the second property of a sled being executable from many addresses may be detectable. Effectively, this property means that exploit code results in the same action despite wide variance in the starting offset. This is in stark contrast to other types of code, which may have different effects for potentially every different starting offset. Additionally, in the case of most non-malicious code, starting from an unintended offset will tend to lead to illegal behaviour at some point (either later or immediately) in program execution. In the case of a successful exploit with a NOP sled, the effects of execution will be as intended by the attacker for most or all starting offsets, and there is unlikely to be illegal code behaviour before the execution of a malicious code payload.

It is relatively rare for legitimate code to have this property, as it requires careful selection of instructions and their parameters to effect. Legitimate code often does not have this property because offsets, addresses, immediates, and second and subsequent bytes of instructions are relatively less constrained or differently constrained than the first byte of an instruction. For code to be omnientrant, the possible values for any given byte are the set intersection of those values legal for the first byte of an instruction, and the bytes legal in the context represented by each preceding series of bytes for which the present byte forms part of a single instruction. Alternatively, such an instruction stream may be generated by successively prefixing a malicious payload with bytes from the set of legal first bytes which also generate valid instructions when followed by the other bytes already chosen (and which do not contain any bytes of the payload; that is, execution proceeds into the payload aligned).

Figure 2:
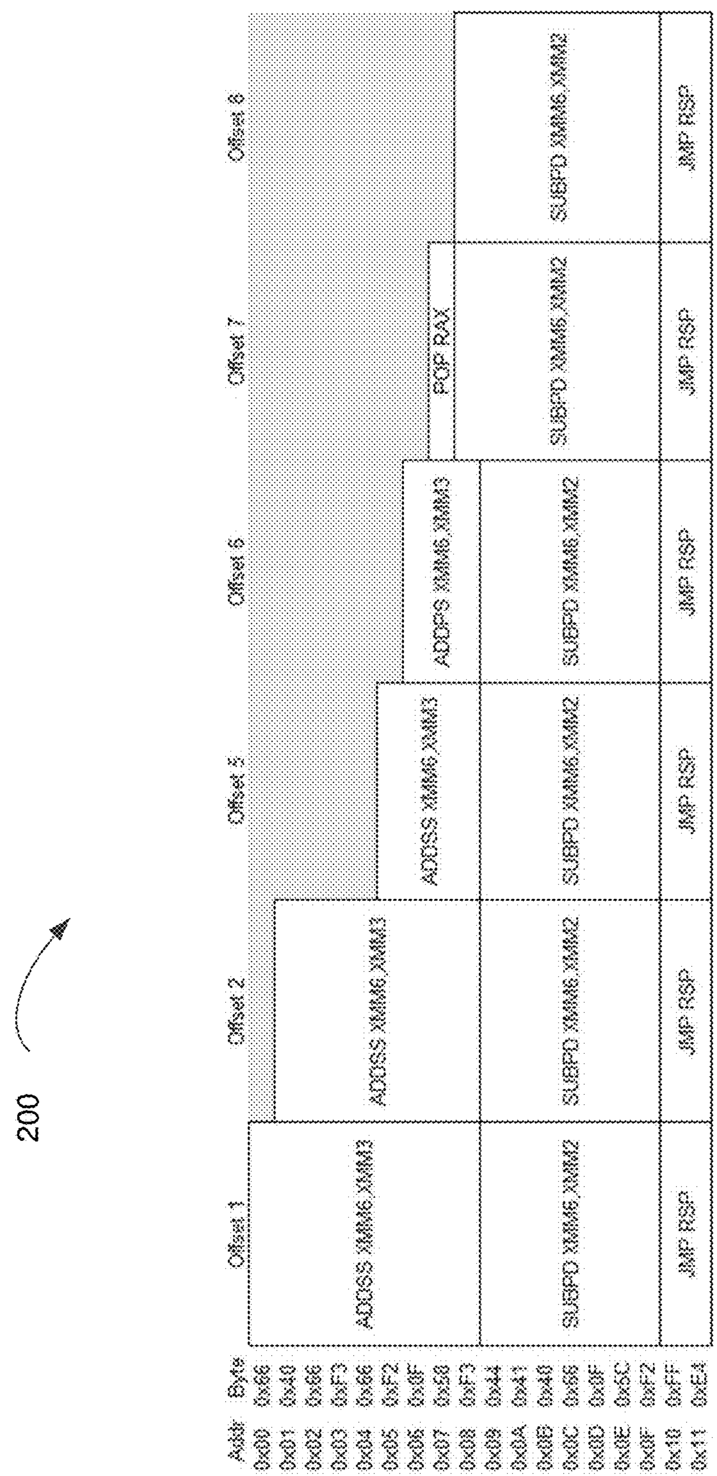
FIG. 2 is a functional block diagram illustrating a simplified example of a malicious code segment featuring omnientrancy.

FIG. 2 is a multi-offset disassembly diagram illustrating a simplified example of a polymorphic NOP sled containing code that is executable from many offsets, e.g. near-omnientrant, and frequently does not impact the state of the target system that the code exploit intends to use. The code bytes at each address of the example are shown along the left axis. Each of the offset histograms corresponds to an entry point address and indicates the effective instruction obtained by executing from the entry point address; shaded regions are prior to the start of execution. In this example, Streaming SIMD Extension (SSE) instructions are utilized, which are x86 instructions used to process floating point data, strings, or arrays, such as vector math, and act upon dedicated XMM registers. Consequently, the majority of SSE instructions, including all those which appear in FIG. 2, do not impact the state of general-purpose registers; in similar examples, execution of instructions on one set of registers might modify the state of other registers such as flag registers or other registers which share a hardware implementation with the manipulated registers, but an attacker can account for this functionality. Further, execution starting from each of the offsets shown in the example will result in valid execution proceeding to the JMP RSP instruction, which will branch to the malicious code payload indicated by the stack pointer. Only the POP RAX instruction of offset 7 results in a change of state impacting the main registers of the processor, which may represent a deliberate tradeoff between stealth and success rate made by a shellcode author; alternatively, the shellcode author has accounted for this eventuality by placing the shellcode address on the stack twice.

The action of the payload, starting at offset 0x10, is invariant regardless of which of the illustrated starting offsets is used. This is the case for the offsets between 0x00 and 0x0D, or about 76% of the total offsets within the code sample. In an actual NOP sled, significantly more sequences exhibiting this characteristic would typically precede the figured code, and the percentage would approach but likely not equal 100%; the ability of the instant approach to accurately ascertain this case where the percentage of valid offsets is other than 100% is one characteristic which distinguishes it from the STRIDE approach. It is difficult to determine whether changing the values of the RAX and XMM6 registers or popping a single value from the stack is significant through static analysis, which is a stealth characteristic of this type of NOP sled.

Figure 3:
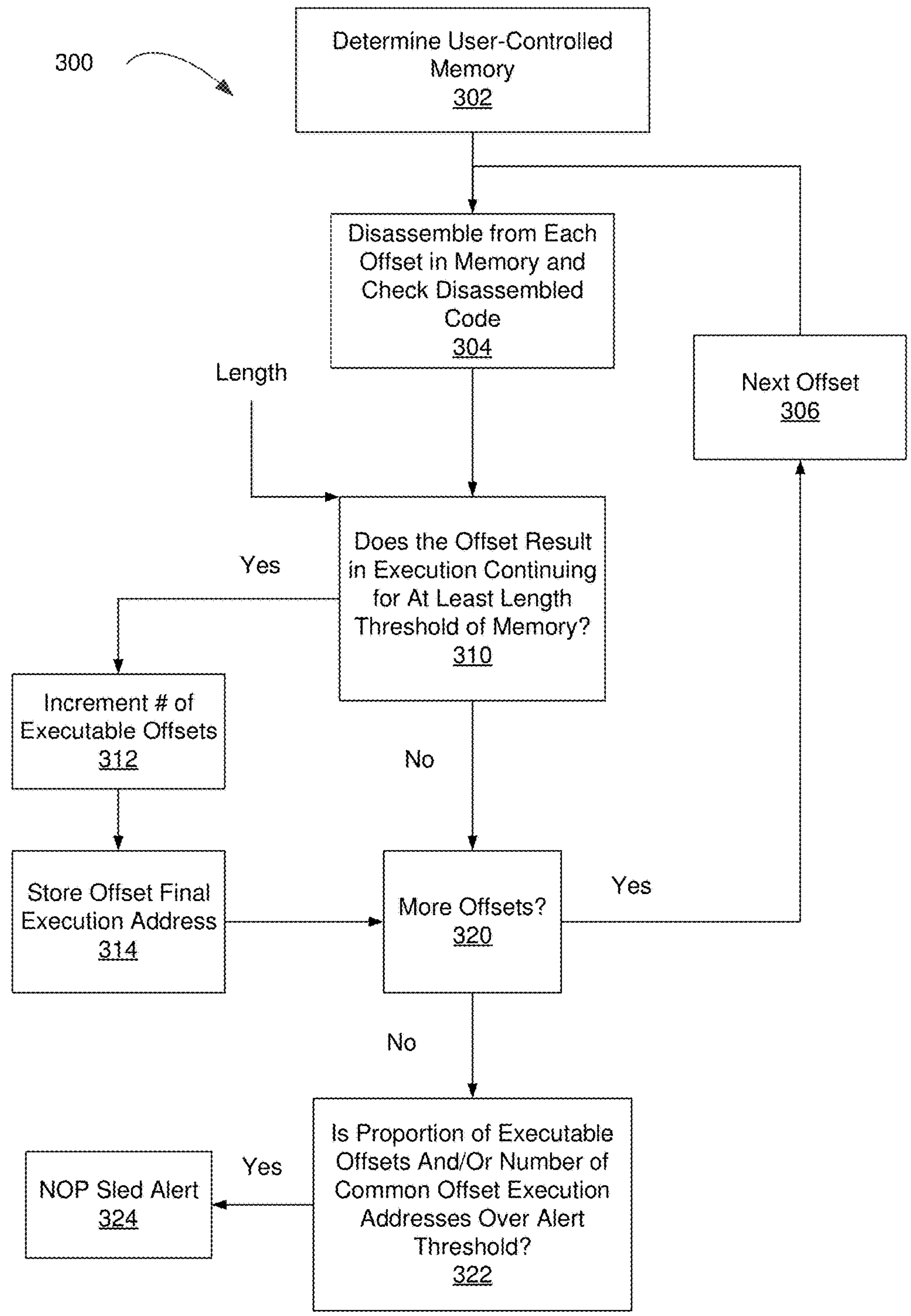
FIG. 3 is a functional block diagram illustrating a simplified example of a NOP sled detection process in accordance with some aspects of the present invention.

FIG. 3 is a control flow diagram illustrating one example of a NOP sled detection process 300 in accordance with certain aspects of the present invention. At step 302, which may be optional, the process scans memory to determine user-controlled contents. These contents, being user-controlled, may also be attacker-controlled. For example, this part of the process excludes parts of memory that are used for internal heap management or that are part of normal program code. This step is beneficial to detection accuracy when the predominant exploitation being detected involves loading exploit code and NOP sleds into memory using legitimate channels, such as placing them in document contents. This refinement offers a substantial improvement over existing methods of detection, since it allows for elimination of false positives and a concentration of detection on areas which are actually likely to contain attacker-generated data.

At step 304, an attempt is made to disassemble the memory content from each offset and determine whether each offset results in execution continuing for some length of memory. A Length threshold may be provided through configuration or calculated from operational parameters. Disassembly may continue, for example, until disassembly is impossible, e.g. the content of the memory does not correspond to a valid instruction code, or a privileged instruction is encountered in a non-privileged context.

The condition that a number of proximal addresses are valid entry points is a positive heuristic for the presence of exploit code preceded by or involving a NOP slide. If the disassembled code is executable from the offset, then a running total of executable offsets is incremented at step 312. A window size or any suitable clustering algorithm may be used to determine proximity for the purposes of this determination.

Also, the determination made by this heuristic may be strengthened by the identification of a common offset to which execution of the various offsets would lead to. For example, if a number of offsets which may or may not be co-proximal may be used as execution starting points, and the series of instructions executed from each of those offsets share a terminal subseries of instruction offsets with a cardinality of one or more, then the likelihood that a NOP slide is present is increased. This property is demonstrated in FIG. 2: offsets 1, 2, 5, 6, and others not shown share a terminal subseries of two instructions with offsets 0x09 and 0x10. At step 314, the final execution address, such as a branch instruction, is stored for use in identifying a common offset execution address for the code. As a refinement of the method, each instruction offset may be stored rather than only the last one, and a common subset determination may be used to determine common instruction series.

Since execution of an instruction starting at one particular offset is effectively an instruction alignment and subsequent execution will nearly always follow the same sequence of instructions following execution of an instruction at one particular alignment regardless of the prior or subsequent executed instructions, this determination can be made explicitly by checking that (within some configurable window size) execution from each offset ultimately leads to execution of a common offset. This common offset has an elevated probability of being part of the payload, but also is frequently one of the instructions in the NOP sled prior to the payload or the instruction at the end of the payload. The distinction between the NOP sled and the payload which follows it may be determined by finding the first instruction which is not effectively a NOP (a system call or interrupt, a jump to a point not within the NOP sled, setting a value in a register which is later used before it is set again, etc.). There begins the payload.

Processing may be discontinued once no further offsets can be disassembled or upon reaching the end of a given window. At step 322, the proportion of executable offsets, i.e. the entry points from which execution is possible, may be considered along with the presence of a common offset to identify the likely presence of a NOP sled, in which case an alert is generated at step 324 that indicates a possible NOP sled and identifies the code addresses and common offset of the suspected sled.

In some examples, process 300 may be modified to examine branch instructions that branch elsewhere within the discovered NOP sled, as well as conditional instructions whose condition is either always true or always false (i.e. the branch condition is a tautology or a fallacy) as determined, for example, through static analysis (both conditional moves and conditional branches as well as any other type of conditional instruction), and these conditions may be deemed to be NOPs. In still other examples, branch instructions may be treated as terminal or as nonterminal; treating branch instructions as nonterminal allows for detection of trampoline NOP sleds. In a refinement of the method, branch instructions which can be statically determined to branch to a destination within a window containing the putative NOP sled may be treated as nonterminal, and other branch instructions may be treated as terminal.

Figure 4:
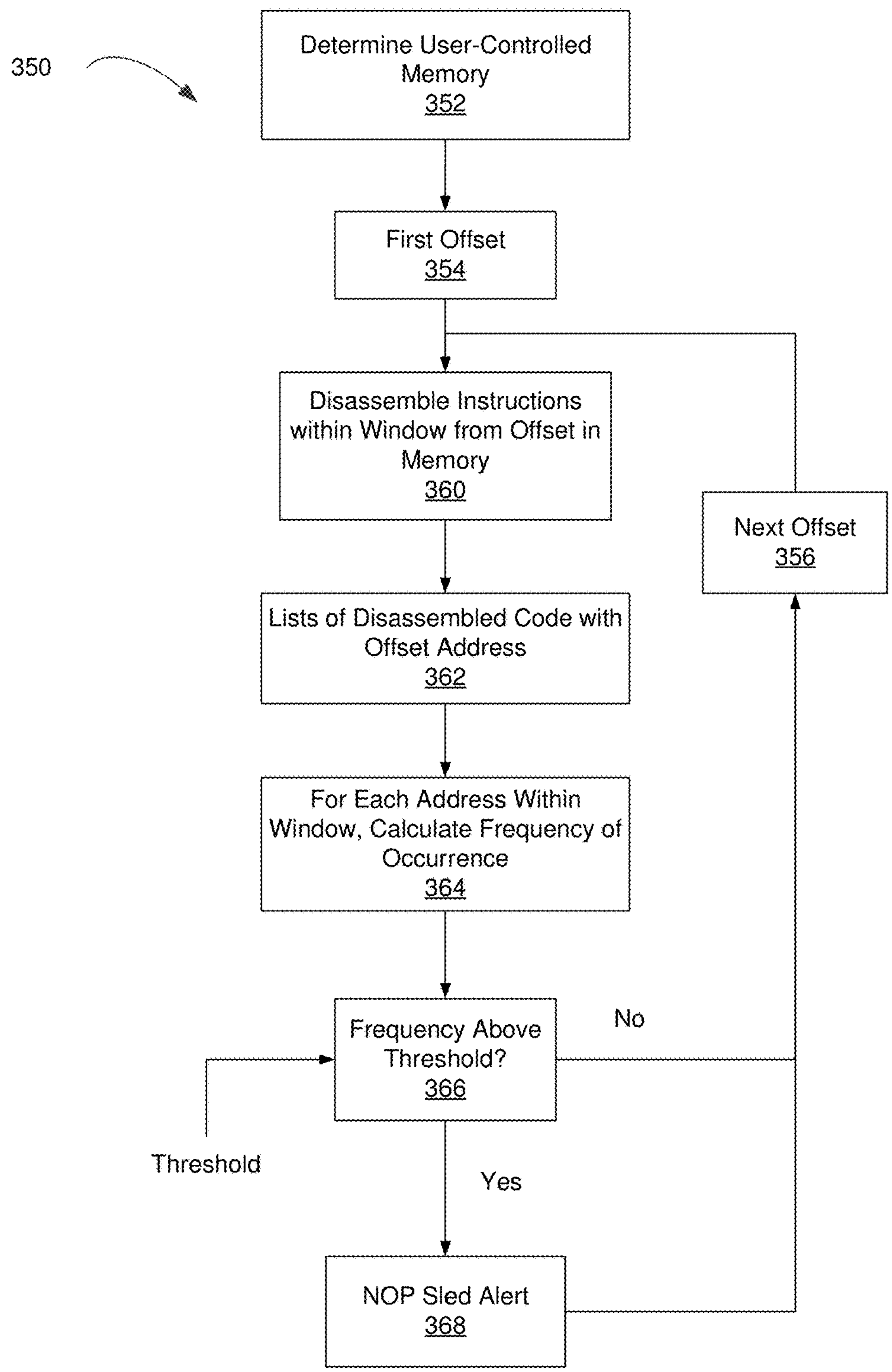
FIG. 4 is a functional block diagram illustrating another simplified example of a NOP sled detection process in accordance with some aspects of the present invention.

FIG. 4 is a control flow diagram of another example of a NOP sled detection process 350 in accordance with certain aspects of the present invention. In this example, disassembly may be limited to a given window size. At step 352, user-controlled memory is identified for analysis, which begins with the first offset at step 354. At step 360, the memory contents within the window are disassembled from that offset to produce lists of disassembled code with the corresponding offset address, step 362. For each address within the code from a window, the frequency of occurrence of that address value is determined. For example, for a window having code values 0x09, 0x09, 0x09, 0x08 and 0x09, the frequency of 0x09 is 4 out of 5. By virtue of being highly skewed toward a particular value, the code segment is suspect as relating to NOP sled detection. By contrast, a window having code values 0x00, 0x02, 0x03, 0x05, 0x07 and 0x09, where no value occurs with a frequency greater than 1 out of 5, the random frequency distribution suggests that the code segment is not part of a NOP sled.

In one refinement of the method, step 366 may be replaced by $$r = 1 - \left( \frac{-2\Sigma_i [P(x_i)\log_2 P(x_i)]}{|x|} \right)$$

where P(x) is the empirical probability a given symbol x appears in the segment, and $x_i$ represents the ith symbol in the segment. The variable r is a normalized heuristic value indicating the relative certainty that the contents of the data segment are homogeneous; this value may be compared against legitimate code or another baseline.

The detection frequency threshold for purposes of NOP sled detection, or the threshold for the refinement, may be configured administratively, heuristically, based upon the processing context, or some combination of these. A higher threshold may yield fewer false positives, but more false negatives. Conversely, a lower threshold may yield fewer false negatives, but more false positives.

If a frequency found at step 364 is greater than the detection frequency threshold, then control branches from step 366 to step 368 to generate a NOP sled alert that, for example, includes the offset involved, the suspect code address, and the frequency. Processing continues for the remainder of the offsets in the memory under analysis.

In a refinement of the method, process 300 of FIG. 3 and process 350 of FIG. 4 are combined, so that process 300 heuristically determines whether some code is a NOP sled, and process 350 strengthens or weakens the heuristic determination depending on whether or not it also determines the presence of a NOP sled.

The NOP sled analysis may provide the input to a static analysis of the memory content to determine if any instructions in the potential NOP sled change state such that potential malicious payload behavior is changed. Alternatively, the identified code may be emulated to obtain the machine state and identify whether the payload is affected. Entropy fingerprinting may also be utilized to determine whether the entropy of the memory content is low enough to be consistent with a NOP sled. Additionally, the payload may be checked against tables of known attack vector code to attempt to find a match.

The present approach to identifying the presence of a NOP sled may be utilized to in a process for the determination of whether heap spray is present. If there appears to be a NOP sled followed by a payload, and the same payload appears at multiple locations within a memory image, then it is likely that the payload is in fact malicious code and was injected into process memory via heap spray. Additionally, the presence of a NOP sled usually constrains the entropy of the block of memory in which it resides. The common practice of spraying the heap with NOP sleds will therefore lower the entropy and assure that heap spray is more apparent. This is always the case with trivial NOP sleds consisting only of one type of literal NOP instructions, but is usually the case to a lesser extent with other types of NOP sleds as well.

In accordance with at least one embodiment of the invention, the system, apparatus, methods, processes and/or operations described herein may be wholly or partially implemented in the form of a set of instructions executed by one or more programmed computer processors, such as a central processing unit (CPU) or microprocessor. Such processors may be incorporated in an apparatus, server, client or other computing device operated by, or in communication with, other components of the system. In accordance with another embodiment of the invention, the system, apparatus, methods, processes and/or operations described herein may be wholly or partially implemented in the form of a set of processor executable instructions stored on persistent storage media.

Figure 5:
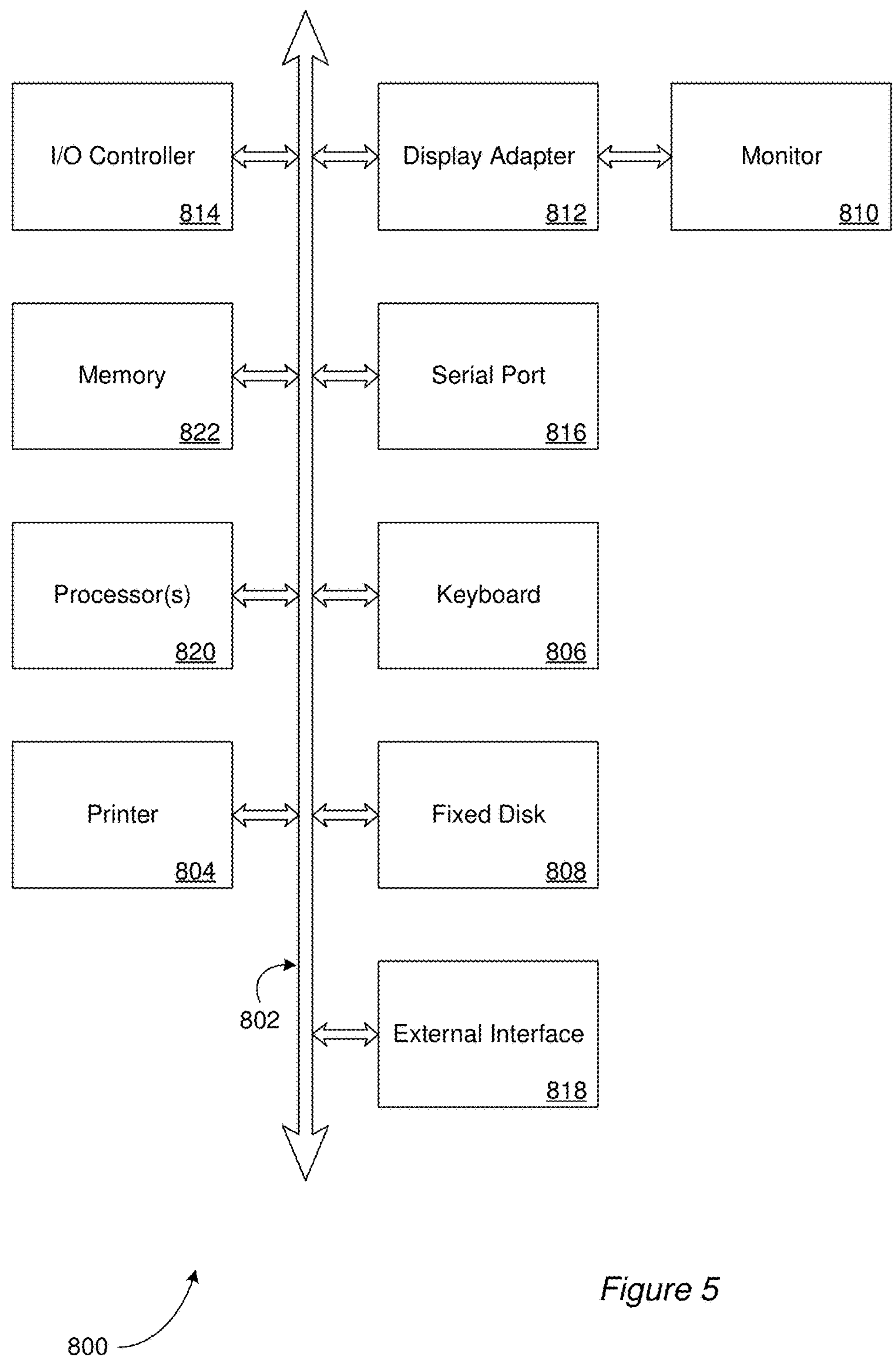
FIG. 5 depicts aspects of elements that may be present in a computer device and/or system configured to implement a method, system and/or process in accordance with some embodiments of the present invention.

FIG. 5 depicts aspects of elements that may be present in one example of a computer device and/or system 800 configured to implement at least some elements of a method, system and/or process in accordance with some embodiments of the present invention. The subsystems shown in FIG. 5 are interconnected via a system bus 802. Additional subsystems include a printer 804, a keyboard 806, a fixed disk 808, and a monitor 810, which is coupled to a display adapter 812. Peripherals and input/output (I/O) devices, which couple to an I/O controller 814, can be connected to the computer system by any number of means known in the art, such as a serial port 816. For example, the serial port 816 or an external interface 818 can be utilized to connect the computer device 800 to further devices and/or systems not shown in FIG. 5 including a wide area network such as the Internet, a mouse input device, and/or a scanner. The interconnection via the system bus 802 allows one or more processors 820 to communicate with each subsystem and to control the execution of instructions that may be stored in a system memory 822 and/or the fixed disk 808, as well as the exchange of information between subsystems. The system memory 822 and/or the fixed disk 808 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl or using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components or steps depicted in the drawings or described above, as well as components and steps not shown or described, are possible without departing from the scope of the invention. Similarly, some features and subcombinations are useful and may be employed without reference to other features and subcombinations. Embodiments of the invention have been described for illustrative and not restrictive purposes, and alternative embodiments will be apparent to one of ordinary skill in the art. Accordingly, the present invention is not limited to the embodiments described above or depicted in the drawings, and various embodiments and modifications can be made without departing from the scope of the invention.

I claim:

1. A method for detecting omnientrant code segments to identify potential malicious code, the method comprising the steps of:

for each offset of a code segment:

disassembling the code segment from the offset, determining whether the disassembled code is executable, and incrementing an offset execution value;

checking whether the offset execution value exceeds an alert threshold value;

generating a malicious code alert for the code segment if the offset execution value exceeds the alert threshold value;

for each executable offset, identifying a final execution address of the offset;

comparing the final execution addresses of the offsets for the code segment; and the step of generating a malicious code alert for the code segment further includes generating the malicious code alert for the code segment if a proportion of the executable offsets have a common value for the final execution address exceeds a frequency threshold.

2. The method of claim 1, where the step of generating the malicious code alert for the code segment further comprises generating the malicious code alert by comparing a homogeneity of a code segment against an empirically derived value r that is a normalized heuristic value indicating a relative certainty that the contents of the data segment are homogeneous obtained from an equation $$r = 1 - \left(\frac{-2\Sigma_i[P(x_i)\log_2 P(x_i)]}{|x|}\right),$$

where P(x) is the empirical probability that a given symbol x appears in the segment, and $x_i$ represents the ith symbol in the segment.

3. The method of claim 1, where the step of disassembling the code segment from the offset further comprises disassembling the code segment within a window of the offset.

4. The method of claim 1, where the method further comprises disassembling each code segment in user-controlled memory.

5. A malicious code detection system for detecting omnientrant code segments, the system comprising one or more processing devices configured to perform the following functions:

for each offset of a code segment:

disassemble the code segment from the offset, determine whether the disassembled code is executable, and increment an offset execution value;

check whether the offset execution value exceeds a threshold value;

generate a malicious code indication for the code segment if the offset execution value exceeds the threshold value;

for each executable offset, identify a final execution address of the offset;

compare the final execution addresses of the offsets for the code segment; and generate the malicious code indication for the code segment further by generating the malicious code alert for the code segment if a proportion of the executable offsets have a common value for the final execution address exceeds a frequency threshold.

6. The malicious code detection system of claim 5, where the one or more processing devices are further configured to generate the malicious code indication by generating the malicious code alert by comparing a homogeneity of a code segment against an empirically derived value r that is a normalized heuristic value indicating a relative certainty that the contents of the data segment are homogeneous obtained from an equation $$r = 1 - \left(\frac{-2\Sigma_i[P(x_i)\log_2 P(x_i)]}{|x|}\right),$$

where P(x) is the empirical probability that a given symbol x appears in the segment, and $x_i$ represents the ith symbol in the segment.

7. The malicious code detection system of claim 5, where the processing devices are further configured to disassemble the code segment from the offset by disassembling the code segment within a window of the offset.

8. The malicious code detection system of claim 5, where the processing devices are further configured to disassemble each code segment in user-controlled memory.

9. A non-transitory computer readable medium storing computer code having instructions stored therein that configure a processing device to operate to detect omnientrant code segments to identify potential malicious code as follows:

for each offset of a code segment:

disassemble the code segment from the offset, determine whether the disassembled code is executable, and increment an offset execution value;

check whether the offset execution value exceeds a threshold value;

generate a malicious code indication for the code segment if the offset execution value exceeds the threshold value;

for each executable offset, identify a final execution address of the offset;

compare the final execution addresses of the offsets for the code segment; and generate the malicious code indication for the code segment further by generating the malicious code alert for the code segment if a proportion of the executable offsets have a common value for the final execution address exceeds a frequency threshold.

10. The non-transitory computer readable medium of claim 9, where the medium further includes instructions that configure the processing device to generate the malicious code alert by comparing a homogeneity of a code segment against an empirically derived value r that is a normalized heuristic value indicating a relative certainty that the contents of the data segment are homogeneous obtained from an equation $$r = 1 - \left(\frac{-2\Sigma_i[P(x_i)\log_2 P(x_i)]}{|x|}\right),$$

where P(x) is the empirical probability that a given symbol x appears in the segment, and $x_i$ represents the ith symbol in the segment.

11. The non-transitory computer readable medium of claim 9, where the medium further includes instructions that configure the processing device to disassemble the code segment from the offset by disassembling the code segment within a window of the offset.

12. The non-transitory computer readable medium of claim 9, where the medium further includes instructions that configure the processing device to disassemble each code segment in user-controlled memory.

* * * * *